E. O. DOSCH.
MILK CAN VENTILATING DEVICE.
APPLICATION FILED AUG. 5, 1912.
1,065,925.
Patented July 1, 1913.
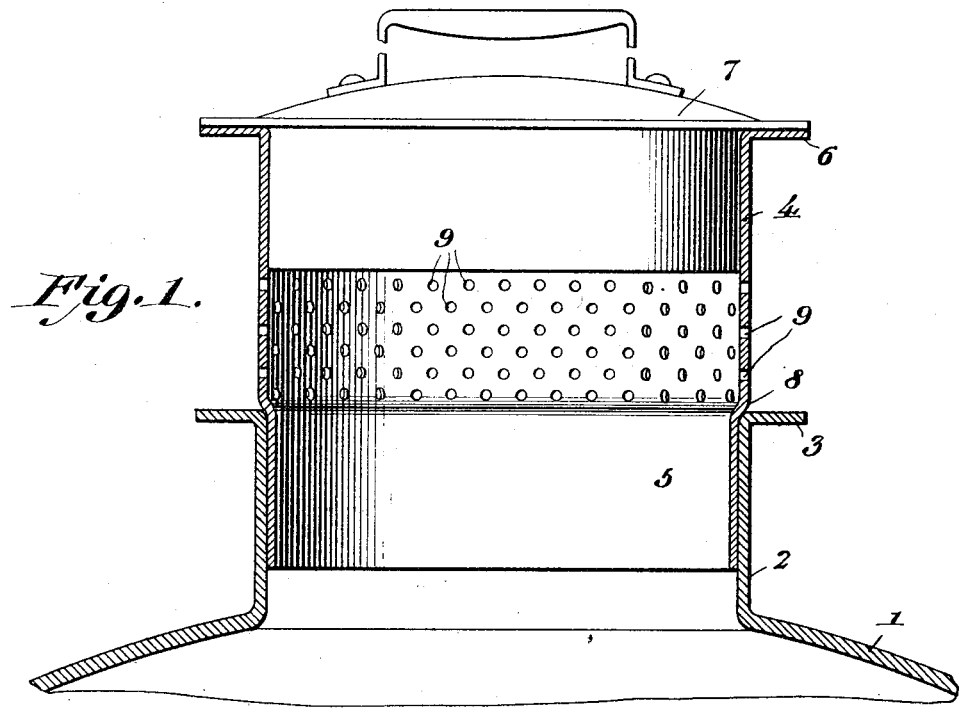
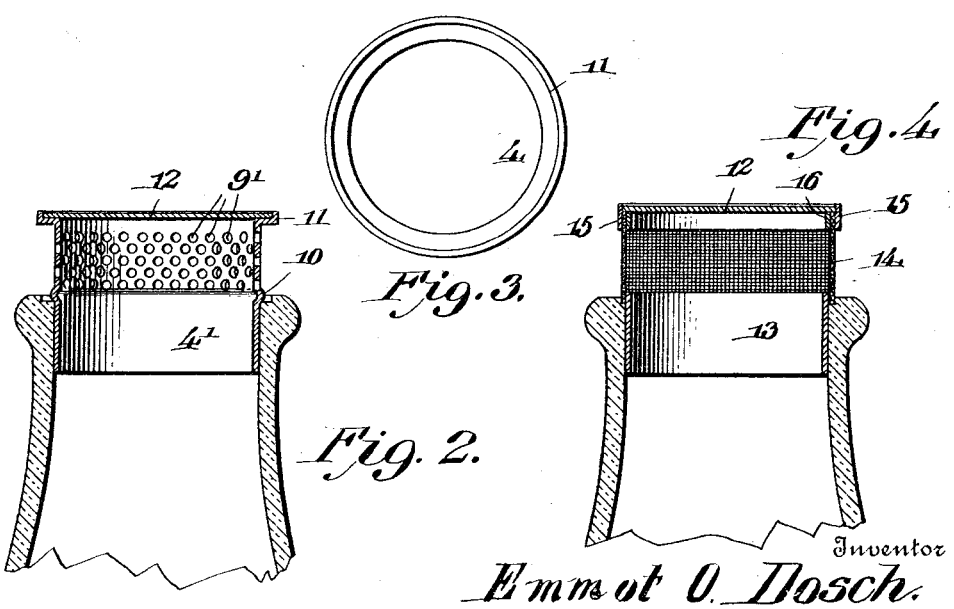
Witnesses
D. B. Galt.
N. S. Austin.
Inventor
Emmot O. Dosch.
By Joshua R. H. Potts
Attorney

UNITED STATES PATENT OFFICE.

EMMOT O. DOSCH, OF CASHTON, WISCONSIN.

MILK-CAN-VENTILATING DEVICE.

1,065,925.  Specification of Letters Patent.  Patented July 1, 1913.

Application filed August 5, 1912. Serial No. 713,338.

*To all whom it may concern:*

Be it known that I, EMMOT O. DOSCH, a citizen of the United States, residing at Cashton, county of Monroe, and State of Wisconsin, have invented certain new and useful Improvements in Milk-Can-Ventilating Devices, of which the following is a specification.

This invention relates to ventilating devices and is especially adapted to be used in connection with milk or cream receptacles.

A common objection to the present method of shipping or packing milk or cream in close or unventilated receptacles, is that the contents by not being supplied with fresh air, become rancid and useless in a short time. This consequently shortens the shipping radius of perishable goods of such character, and also permits the milk and cream to retain the animal flavor common thereto, and of which it would be relieved if supplied by fresh air. Should the lids or covers of the receptacles be left off, in an effort to overcome these objections, the contents is liable to become infected by flies and other insects, dust and dirt, and is also accessible to small animals such as cats, dogs, etc.

It is the principal object of my invention to overcome these objections.

A further object of my invention is to provide a device for the purpose mentioned which is simple in construction and yet thoroughly efficient, and which, while allowing free passage of air to the contents of the receptacle, will prevent the access of animals or insects thereto.

My device may be made in several sizes to fit upon the receptacles of different dimensions, and different types, however, the same basic principle is employed in the various changed forms and the manner of application remains the same.

In carrying out my invention I resort to the use of a ventilator which is hollow, and preferably cylindrical in shape, or of a shape to correspond to that of the mouth of the receptacle, and which is adapted to fit into or upon the top of a milk or cream receptacle. The lower portion of the ventilator extends a suitable distance into the mouth of the receptacle to insure its stability, and the outer or exposed surface of the cylinder is provided around its periphery with a plurality of perforations. To prevent the ventilator from extending too far into the receptacle, a stop is provided upon the exterior of the cylinder to engage the mouth of the vessel. The upper end of the ventilator is designed to accommodate the cap or top of the receptacle to which it is applied and its upper edge is therefore of a construction similar to that of the mouth of the receptacle itself. The perforations in the cylinder, while being of a size small enough to exclude insects and the like, allow for the free passage of air into and out of the vessel. The cover of the receptacle, being positioned upon the upper end of the ventilator, prevents insects or other vermin from entering through the top.

In the drawings forming a part of this specification, Figure 1 is a vertical section of a ventilating device embodying my invention and illustrating the same in the form used upon large cans such as are employed in shipping milk, the mouth of the can and the cover being also illustrated. Fig. 2 is a similar view illustrating the device as preferably constructed for use in conjunction with the usual milk delivery bottle, the mouth of the bottle being shown in section. Fig. 3 is a plan view of the device illustrated in Fig. 2, and, Fig. 4 is a modified form of the device.

Referring now to Fig. 1 of the drawings, the upper end of a milk can of the usual well known construction is illustrated at 1, and is provided with a neck or mouth 2, the latter being flanged at its upper end in the usual manner as at 3. My improved ventilator comprises a hollow cylinder 4, formed preferably of sheet metal, being at its upper end of a diameter equal to that of the mouth of the receptacle, while at its lower end the cylinder is reduced in diameter as at 5 to fit snugly into the mouth of the receptacle. The upper edge of the cylinder 4 is preferably flared as at 6, to correspond to the flare or flange 3 of the receptacle, and said upper end is adapted to receive the cover 7 of the receptacle. The cylinder is prevented from extending too far into the receptacle neck by the shoulder 8, which is formed around the circumference of the cylinder where the reduced end 5 of the cylinder joins the upper portion. Air is admitted to the interior of the cylinder and to the milk receptacle through perforations 9, which are spaced around the circumference of the ventilator 4 in the space above the shoulder 8 and below the line of the lower extremity of the cap or cover 7. It will thus be seen that air may pass freely through the small perforations and to the interior of the receptacle, and the animal heat allowed to escape without danger of dirt, insects, etc., being admitted, and the presence of the cap or cover of the milk can upon the top of the ventilator protects the milk or other contents against small animals.

In Fig. 2 of the drawings I have illustrated my invention in connection with the ordinary milk bottle, and in which there is but slight change over the form shown in Fig. 1, except that it is reduced in size to be adapted for use upon the ordinary milk bottle. The cylinder 4' in this form is of the same diameter throughout its entire length, being provided with a peripheral groove 10 intermediate its ends to limit its inward movement when placed in position within the mouth of the receptacle, and above the perforations 9' the upper end is formed with a seat 11 for the usual paper cap 12 of the bottle.

Fig. 4 illustrates a further modification of the form shown in Fig. 2, and in which wire mesh is employed in lieu of the perforations in the periphery of the cylinder. In this form a cuff or band 13 is employed and is of a diameter to snugly fit into the mouth of the milk bottle. Soldered or otherwise secured to the outer upper edge of the cuff 13 is a band of wire mesh 14, which is of a width sufficient to admit proper ventilation. Secured to the top of the wire mesh and to the outer edges thereof is a metallic band 15. This band extends a short distance above the upper edge of the wire mesh and is adapted to confine within its inner circumference the paper cap 12 of the milk bottle. A metallic band 16 may be secured to the inside of the wire mesh and in such position that its upper edge is in the same plane as that of the upper edge of the wire 14, so as to enlarge the seat for the paper cap 12. The lower end of the wire mesh 14, being soldered or secured to the outside of the cuff 13, forms an annular shoulder to prevent the ventilator from extending too far into the bottle.

It will be obvious from this description taken in connection with the drawings that a can or bottle ventilator constructed in accordance therewith will be of extreme benefit to those interested in milk and cream shipping, in view of the fact that the ventilators are inexpensive, simple in construction, and may be easily and quickly applied to a can or bottle. The contents of the receptacle is at all times exposed to a current of fresh air, and the danger of animals or insects gaining access thereto is reduced to a minimum. The ventilators, by their simple construction are readily renovated, and their use upon milk or cream receptacles relieves the contents of the animal flavor common to milk shipped in air tight vessels, and also keeps the contents sweeter a greater length of time.

Having thus described my invention, what I claim and desire to secure by Letters Patent is:—

1. A ventilator of the class described comprising a tubular member open at both ends, one end of said member being adapted to be inserted into the mouth of a vessel, the other end of said tubular member being adapted to receive the cover of said vessel, and the walls of said tubular member being provided with a foraminated portion, substantially as described.

2. A ventilator of the class described comprising a tubular member open at both ends, one end of said member being adapted to be inserted into the mouth of a vessel, the other end of said tubular member being adapted to receive the cover of said vessel, a stop for limiting the inward movement of the said tubular member into the vessel, and the walls of said tubular member being provided with a foraminated portion, substantially as described.

3. A ventilator of the class described comprising a tubular member open at both ends, one end of said member being adapted to be inserted into the mouth of a vessel, the other end of said tubular member being adapted to receive the cover of said vessel, the walls of said tubular member being provided with a foraminated portion intermediate its ends, and an offset formed upon the said walls below the foraminated portion, substantially as described.

4. A ventilator of the class described comprising a tubular member open at both ends, one end of said member being adapted to be inserted into the mouth of a vessel, the other end of said tubular member being enlarged to receive the cover of said vessel, and the walls of said tubular member being provided with a foraminated portion, substantially as described.

5. A ventilator of the class described comprising a tubular member open at both ends, one end of said member being reduced in size to fit within the mouth of a receptacle, the other end of said tubular member being of the same size and construction as the mouth of said receptacle to receive the cover thereof, a stop for limiting the inward movement of the said tubular member into the vessel, and the exposed walls of said tubular member being foraminated, substantially as described.

In testimony whereof I have signed my name to this specification in the presence of two subscribing witnesses.

EMMOT O. DOSCH.

Witnesses:
WM. McMULLIN,
P. J. HEGGE.